United States Patent
Wormsbaecher et al.

(10) Patent No.: US 8,167,726 B2
(45) Date of Patent: May 1, 2012

(54) CONSTANT VELOCITY JOINT GREASE CAP WITH INCREASED TORSIONAL COMPLIANCE

(75) Inventors: Hans Wormsbaecher, Lake Orion, MI (US); Craig A. Campbell, West Bloomfield, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 276 days.

(21) Appl. No.: 12/593,742

(22) PCT Filed: Apr. 4, 2007

(86) PCT No.: PCT/US2007/065968
§ 371 (c)(1),
(2), (4) Date: Sep. 29, 2009

(87) PCT Pub. No.: WO2008/123877
PCT Pub. Date: Oct. 16, 2008

(65) Prior Publication Data
US 2010/0105488 A1    Apr. 29, 2010

(51) Int. Cl.
*F16D 3/223*    (2011.01)
*F16N 1/00*     (2006.01)

(52) U.S. Cl. .......................... 464/15; 464/906

(58) Field of Classification Search .................... 464/15, 464/69, 81, 84, 85, 180, 906
See application file for complete search history.

(56) References Cited

U.S. PATENT DOCUMENTS

| | | | | |
|---|---|---|---|---|
| 1,893,593 | A * | 1/1933 | Oechsle | 464/69 |
| 2,901,896 | A * | 9/1959 | Reich | 464/85 |
| 3,199,313 | A * | 8/1965 | Paulsen | 464/85 |
| 3,418,827 | A * | 12/1968 | Bernard | 464/85 |
| 4,182,139 | A * | 1/1980 | Hornig et al. | 464/69 |
| 4,515,573 | A | 5/1985 | Eichinger | |
| 4,639,237 | A * | 1/1987 | Fukuda | 464/81 |
| 5,484,339 | A | 1/1996 | Birioukov et al. | |
| 2003/0022720 | A1* | 1/2003 | Takei | 464/69 |
| 2005/0075173 | A1* | 4/2005 | Kotsusa | 464/69 |

* cited by examiner

*Primary Examiner* — Gregory Binda
*Assistant Examiner* — Josh Skroupa
(74) *Attorney, Agent, or Firm* — Jennifer M. Brumbaugh; Mick A. Nylander; Rader, Fishman & Grauer PLLC

(57) ABSTRACT

A sealing cover assembly for an articulating joint. The articulating joint includes a first rotational member and a second rotational member. The sealing cover assembly includes a first portion having a plurality of fastening portions. The fastening portions are coupled to the second rotational member for rotation therewith. The sealing cover assembly also includes a second portion adapted for connecting to the driveline and a plurality of damping members constructed of at least a first material and interconnecting the first portion to the second portion.

12 Claims, 3 Drawing Sheets

CONSTANT VELOCITY JOINT GREASE CAP WITH INCREASED TORSIONAL COMPLIANCE

TECHNICAL FIELD

The present disclosure relates to torsional damping and in particular to a constant velocity joint (CVJ) sealing cover assembly including, a torsional damper.

BACKGROUND

Universal joints, and especially constant velocity joints, operate to transmit torque between two rotational members. The rotational members are typically interconnected by a cage, or yoke, that allows the rotational members to operate with their respective axes at a relative angle. Constant velocity joints and similar rotating couplings typically include a boot cover assembly and grease cover to enclose and protect the coupling during operation. Since the boot cover assembly is partially flexible, the boot cover assembly is able to seal around the joint while permitting articulation and relative axial movement of differing rotating members of the joint. The boot cover assembly and the grease cover seal lubricant in the joint so as to reduce friction and extend the life of the joint. The boot cover assembly and the grease cover also seal out dirt, water and other contaminants to protect the functionality of the joint. However, leaks may reduce the life of the joint, and contaminants in the grease may disturb the chemical composition of the grease, degrading its performance.

Universal joints are commonly classified by their operating characteristics. One important operating characteristic relates to the relative angular velocities of the two shafts connected thereby. In a constant velocity type of universal joint, the instantaneous angular velocities of the two shafts are always equal, regardless of the relative angular orientation between the two shafts. In a non-constant velocity type of universal joint, the instantaneous angular velocities of the two shafts vary with the angular orientation (although the average angular velocities for a complete rotation are equal as one shaft accelerates and decelerates relative to the rotational speed of the other shaft, creating a rotational speed oscillation). Another important operating characteristic of a joint may be the ability of the joint to allow relative axial movement between the two shafts. A fixed joint does not allow this relative movement, while a plunge joint does.

FIG. 1 illustrates an exemplary the CVJ 20. The CVJ 20 includes driven end 22 and a driving end 24. The CVJ 20 further includes a joint assembly 26 coupled to a shaft 28 with a boot cover assembly 30 connected therebetween. The CVJ 20 further includes a grease cover 32 that seals the driven end 22. The boot cover assembly 30 includes a metal cover 34 and a flexible boot 40. A portion of the metal cover 34 is crimped onto the boot 40 for attachment thereto. The boot cover assembly 30 protects the moving parts of the CVJ 20 during operation. The joint assembly 26 includes a first rotational member 42, a second rotational member 44, and a plurality of balls 46 retained in a race 48. The shaft 28 is splined to the second rotational member 44 to allow axial movement therebetween.

When the instantaneous angular velocities of two portions of a driveline are not equal, the differences in velocities will impart a torsional oscillation into the driveline. That is, for example, since the instantaneous rotational velocity of at least the balls 46 and the race 48 are different than the instantaneous rotational velocity of the first rotational member 42 and the second rotational member 44 when the joint 20 is operating at an angle (the first rotational member 42 and the second rotational member 44 are not coaxial), torque and rotational velocity that is transmitted from the first rotational member 42 to the second rotational member 44 will include an oscillatory magnitude imparted by a fraction of the rotational inertia of the balls 46 and the race 48. A rotational speed or torque with an oscillatory magnitude may undesirably drive other vibrations within a drive train or a vehicle, or may reduce the useful life of drivetrain components.

Other contributors of oscillatory magnitude of rotational speed and torque within a drivetrain include the combustion events in an internal combustion engine, gear backlash, and the magnetic field pull and push between the magnet and the armature of an electric motor. While a large portion of the magnitude of these oscillations may be dampened by the torsional deflection of torque transmitting shafts and torsional dampers, such as those found in clutch disks, some oscillatory magnitude will typically transmit through the driveline. Additionally, shorter shafts may result in less 'absorption' of rotational speed and torque oscillations, resulting in a greater magnitude of transmitted oscillations.

What is needed, therefore, is an apparatus and method of reducing or eliminating the oscillatory magnitude of rotational speed and torque within a drivetrain.

SUMMARY

An embodiment includes a sealing cover assembly for an articulating joint. The articulating joint includes a first rotational member and a second rotational member. The sealing cover assembly includes a first portion having a plurality of fastening portions. The fastening portions are coupled to the second rotational member for rotation therewith. The sealing cover assembly also includes a second portion adapted for connecting to the driveline and a plurality of damping members constructed of at least a first material and interconnecting the first portion to the second portion.

BRIEF DESCRIPTION OF THE DRAWINGS

Referring now to the drawings, preferred illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are not intended to be exhaustive or otherwise limit or restrict the claims to the precise forms and configurations shown in the drawings and disclosed in the following detailed description:

DETAILED DESCRIPTION

Figure 1:
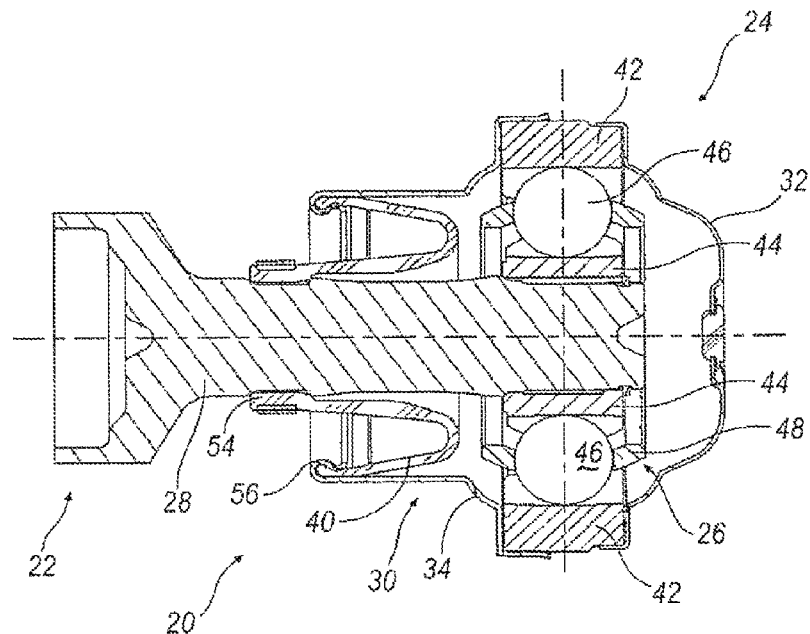
FIG. 1 is a sectional view of a constant velocity joint.
Figure 2:
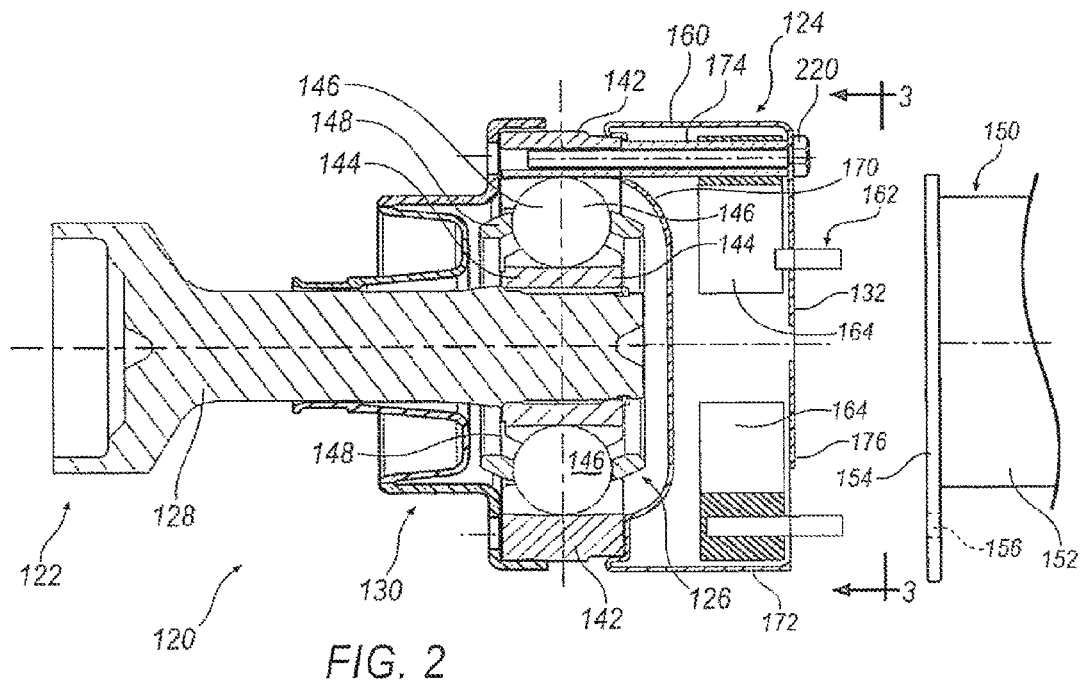
FIG. 2 is a sectional view of a joint assembly in accordance with an embodiment.

FIG. 2 illustrates a constant velocity joint 120 having a driven end 122 and a driving end 124. Joint 120 further includes a joint assembly 126 that is coupled to a shaft 128. A boot cover assembly 130 is connected between the joint assembly 126 and the shaft 128. A sealing cover assembly 132 seals the driven end 122 of joint 120. Joint assembly 126 includes a first rotational member 142, a second rotational member 144, and a plurality of balls 146 retained in a race 148. As illustrated, shaft 128 is splined to second rotational member 144 and the second rotational member 144 is positioned coaxial with the first rotational member 142.

As illustrated in FIG. 2, the sealing cover assembly 132 interconnects the joint 120 with a driveshaft 150. The driveshaft 150 includes a shaft portion 152 and a flange portion 154 having a plurality of second portion coupling apertures 156. In the embodiment illustrated, the flange portion 154 is generally triangular shaped and centered on the shaft portion 152.

The joint assembly 126 can be any type of articulated universal joint, including a plunging tripod, a fixed tripod, a plunging ball joint, and a fixed ball joint. Typical joint assemblies are disclosed in commonly-owned U.S. Pat. Nos. 6,817,950, 6,776,720, 6,533,669 and 6,368,224, and 5,899,814, the disclosures of which are hereby incorporated by reference in their entireties. The driven end 122 may be welded or otherwise coupled to a driveshaft or other drivetrain component.

Figure 4:
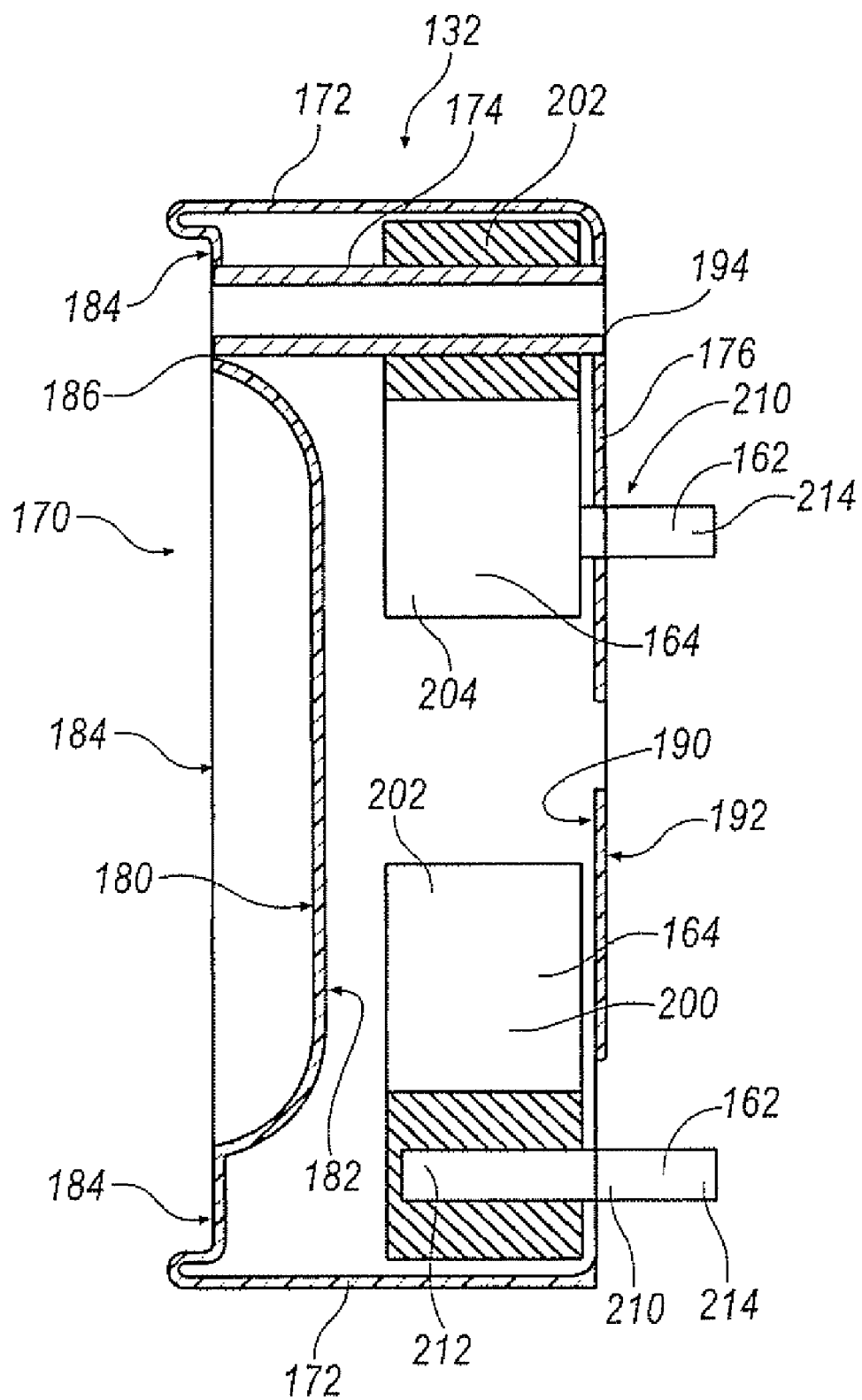
FIG. 4 is a sectional view taken along line 4-4 of FIG. 3, with some items removed for clarity.

The sealing cover assembly 132 includes a first portion 160, a second portion 162, and a plurality of damping members 164. The first portion 160 includes a generally circular sealing portion 170, a generally cylindrical outer portion 172, and a plurality of fastening portions 174, and a cover plate 176. The sealing portion 170 includes a sealing surface 180 (FIG. 4), an opposing interior surface 182, and a joint mating surface 184 with a plurality of joint mating surface apertures 186 formed therein. The sealing portion 170 may include a vent (not shown) as desired.

The cover plate 176 includes a cover plate interior surface 190, a cover plate exterior surface 192, and a plurality of cover plate apertures 194. Each damping member 164 includes a body 200 having a first portion coupling portion 202 and a second portion coupling portion 204.

The second portion 162 includes a plurality of elongated members 210 that extend through the second portion coupling apertures 156 to couple to the flange portion 154 of the drive shaft 150. Each member 210 includes a damping member coupling portion 212 and a flange coupling portion 214.

A fastener 220 (FIG. 2), such as, for example, a bolt, may be interposed through each cover plate aperture 194, a fastening portion 174, a first portion coupling portion 202, a joint mating surface aperture 186, and into the first rotational member 142. As at least one of the fasteners 220 is fastened, such as rotating a bolt as threads extending from the bolt engage a threaded surface formed on the interior of the first rotational member 142, the first portion 160 is coupled to the first rotational member 142 of the joint 120, the joint mating surface 184 of the sealing portion 170 is coupled to first rotational member 142, sealing the lubricant within the joint 120, and the fastening portion 174 of the first portion 160 is coupled to at least one of the damping members 164.

Figure 3:
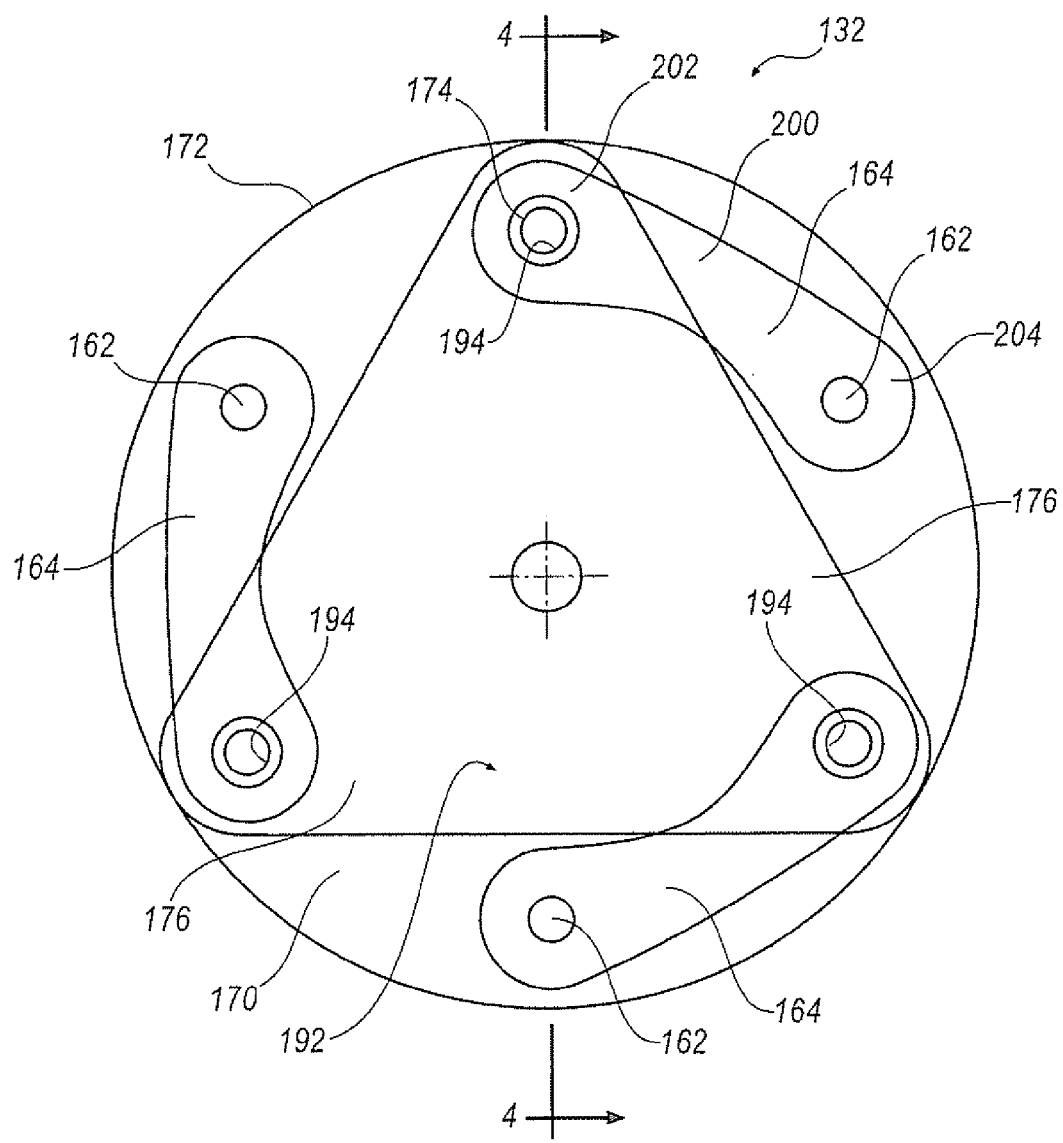
FIG. 3 is a sectional view taken along line 3-3 of FIG. 2, with some components visible through a cover plate for clarity.

In the embodiment illustrated, the fastening portions 174 are tubular metal bushings that extend from the sealing portion 170 and the first rotational member 142 to the cover plate 176, and the first portion 160 and the second portion 162 are 8-gauge sheet metal, although other suitable thicknesses and materials may be used. Additionally, while the cover plate 176 is illustrated in a triangular shape in FIG. 3, the cover plate 176 may be generally circular with arcuate slots (not shown) for the second portions 162 to extend therethrough to better seal the interior of the sealing cover assembly 132 and the damping members 164 from the operating environment of the joint 120.

Also in the embodiment illustrated, the sealing cover assembly 132 includes three damping members 164. although any suitable number of damping members may be used. Specifically, a single annular damping member having appropriately spaced apertures for the second portions 162 and the fastening members 174 may be used.

The damping members 164 selectively dampen torsional oscillations within the drive train as the joint 120 rotates due to the energy absorbing properties of the material of construction of the damping members 164. In the embodiment illustrated, the damping members 164 are constructed of a first material that is preferably a flexible material with suitable damping qualities, and may be plastic or any polymer or elastomer, such as rubber, silicone, or thermoplastic elastomer (TPE).

An embodiment of a method of torsionally damping a driveline with the joint 120 is as follows. During operation torque is transferred between the driveshaft 150 and the shaft 128 through the damping members 164. When the rotational speed of one of the driveshaft 150 and the shaft 128 includes an oscillatory magnitude, the increase and decrease in rotational speed of one of the driveshaft 150 and the shaft 128 will urge the other of the driveshaft 150 and the shaft 128 to rotate with a similar oscillatory magnitude. However, as the increase in rotational speed is transmitted through the damping members 164 the damping members 164 will absorb, or store, energy, and as the decrease in rotational speed transmits through the damping members 164 the damping members 164 will release the stored energy, resulting in a rotational speed with a lower oscillatory magnitude.

Thus assembled and operated, the plurality of damping, members 164 interconnect the first portion 160 with the second portion 162 as the sealing, cover assembly 132 provides a rotational damper for the driveline containing the joint 120.

The damping members 164 may include wires or other second materials within the body 200 to stiffen the body 200 and permit the body 200 to store a greater amount of energy than if the body were constructed of only the first material. The second material is preferably a metal and/or a metal alloy and may be encircled around the damping, member coupling portion 212 and the fastening members 174 to provide additional resistance against the deformation of the body 200 as torque is applied thereto.

Although the steps of the method of constructing the joint 120 are listed in a preferred order, the steps may be performed in differing orders or combined such that one operation may perform multiple steps. Furthermore, a step or steps may be initiated before another step or steps are completed, or a step or steps may be initiated and completed after initiation and before completion of (during the performance of) other steps.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A sealing cover assembly for an articulating joint within a driveline, the articulating joint including a first rotational member and a second rotational member, the sealing cover assembly comprising:
 a first portion having at least one fastening portion, wherein the fastening portions are coupled to the second rotational member for rotation therewith;
 a second portion adapted for connecting to the driveline;
 at least one damping member constructed of at least a first material and interconnecting the first portion to the second portion; and
 wherein the first material is selected from the group consisting of a thermoplastic elastomer, rubber, and silicone.

2. The sealing cover assembly of claim 1, wherein the first portion is selectively coupled to the second rotational member of the articulating joint for sealing a lubricant within the articulating joint.

3. The sealing cover assembly of claim 1, wherein the fastening portion includes a plurality of fasteners, and the first portion and the damping member is selectively coupled to the second rotational member of the articulating joint with the plurality of fasteners.

4. The sealing cover assembly of claim 1, wherein the second portion is adapted to couple to a driveshaft.

5. The sealing cover assembly of claim 1, wherein the damping member is constructed of a second material, and wherein the second material is selected from the group consisting of metal and a metal alloy.

6. The sealing cover assembly of claim 1, wherein the first portion includes a bushing interposed within at least one damping member, and the at least one damping member selectively dampens torsional oscillations within the driveline.

7. An articulating joint for a drive train comprising:
 a first rotational member:
 a second rotational member coupled with and positioned coaxial to the first rotational member; and
 a sealing assembly having a first portion, a second portion, and a plurality of damping members, wherein the first portion includes a plurality of fastening portions, the fastening portions are coupled to the second rotational member for rotation therewith, the second portion is selectively connected to the driveline, wherein the plurality of damping members interconnect the first portion to the second portion, and wherein at least a portion of the damping members are constructed of a first material selected from the group consisting of a thermoplastic elastomer, rubber, and silicone.

8. The articulating joint of claim 7, wherein the fastening portions include a plurality of fasteners, and the first portion and at least one of the plurality of damping members are selectively coupled to the second rotational member of the articulating joint with the plurality of fasteners.

9. The articulating joint of claim 7, wherein the second portion is adapted to couple to a driveshaft and the damping members selectively dampen torsional oscillations within the drive train.

10. The articulating joint of claim 7, wherein the first portion is selectively coupled to the second rotational member of the articulating joint for sealing a lubricant within the articulating joint.

11. The articulating joint of claim 7, wherein at least a portion of the damping members are constructed of a second material, and wherein the second material is selected from the group consisting of metal and a metal alloy.

12. The articulating joint of claim 7, further comprising a sealing portion at least partially interposed between the second rotational member and the first portion.

* * * * *